(12) United States Patent
Scheer

(10) Patent No.: US 9,981,590 B2
(45) Date of Patent: May 29, 2018

(54) INDIVIDUAL, UNIVERSAL, REMOVABLE, LOAD-BEARING PALLET FOR CAR-CARRYING VEHICLE

(71) Applicant: LOHR ELECTROMECANIQUE, Hangenbieten (FR)

(72) Inventor: Daniel Scheer, Still (FR)

(73) Assignee: LOHR ELECTROMECANIQUE, Hangenbieten (FR)

( * ) Notice: Subject to any disclaimer, the term of this patent is extended or adjusted under 35 U.S.C. 154(b) by 0 days. days.

(21) Appl. No.: 15/329,607

(22) PCT Filed: Jul. 22, 2015

(86) PCT No.: PCT/FR2015/052014
§ 371 (c)(1),
(2) Date: Jan. 27, 2017

(87) PCT Pub. No.: WO2016/016548
PCT Pub. Date: Feb. 4, 2016

(65) Prior Publication Data
US 2017/0217354 A1     Aug. 3, 2017

(30) Foreign Application Priority Data
Jul. 28, 2014   (FR) ...................... 14 57306

(51) Int. Cl.
*B60P 7/08*   (2006.01)
*B60P 3/07*   (2006.01)
*B60P 3/08*   (2006.01)

(52) U.S. Cl.
CPC .................. *B60P 3/07* (2013.01); *B60P 3/08* (2013.01); *B60P 7/0823* (2013.01)

(58) Field of Classification Search
CPC .... B60P 3/08; B60P 3/07; B60P 3/122; B60P 3/42; B60P 3/079; B60P 1/00; B60P 3/073; B60P 3/077
(Continued)

(56) References Cited

U.S. PATENT DOCUMENTS 4,668,142 A    5/1987 Fity et al.
4,801,229 A *  1/1989 Hanada ..................... B60P 3/08
                                                           410/26
(Continued)

FOREIGN PATENT DOCUMENTS

AU    2008209867 A1    4/2009

OTHER PUBLICATIONS

International Search Report from parent PCT application PCT/FR2015/052014 dated Nov. 9, 2015, 2 pages.

*Primary Examiner* — D Glenn Dayoan
*Assistant Examiner* — Sunsurraye Westbrook
(74) *Attorney, Agent, or Firm* — Tech Valley Patent, LLC; John Pietrangelo

(57) ABSTRACT

A load-bearing palette includes two side frames; crosspieces; two end support areas for supporting car wheels; and a free central space. The first area includes a wheel support acting as an abutment for the first set of wheels; a transverse element connecting both side frames and having two oblique arms joined at a central portion directed towards an end of the palette; a recess between the wheel support and the transverse element having a width continually decreasing from the side frames to the central portion, into which a first set of wheels sinks down, regardless of the wheelbase type and the track width of the car. The second area includes decking, the dimensions of which are sufficient to support a second set of wheels, regardless of the wheelbase type and the track width of the car.

16 Claims, 5 Drawing Sheets

(58) Field of Classification Search
USPC .................. 410/24, 8, 26, 28.1, 29.1, 89, 4; 414/228, 498, 542, 812
See application file for complete search history.

(56) References Cited

U.S. PATENT DOCUMENTS

| | | | |
|---|---|---|---|
| 5,525,026 A | 6/1996 | Demonte et al. | |
| 6,497,541 B2* | 12/2002 | Pawluk | B60P 3/08 410/26 |
| 7,186,065 B2* | 3/2007 | Clive-Smith | B60P 3/08 410/24 |
| 8,356,962 B2* | 1/2013 | Crook | B60P 3/08 410/16 |
| 2007/0020059 A1 | 1/2007 | Rapelli | |

* cited by examiner

INDIVIDUAL, UNIVERSAL, REMOVABLE, LOAD-BEARING PALLET FOR CAR-CARRYING VEHICLE

CROSS-REFERENCE TO RELATED APPLICATIONS

This application is a § 371 filing of PCT application PCT/FR2015/052014 filed on Jul. 22, 2015, which claims priority from French application FR 1457306 filed on Jul. 28, 2014. The disclosures of these applications are included by reference herein in their entirety.

BACKGROUND

Field of the Invention

This invention relates to the general art of the transportation of freight, more specifically the transportation of cars using handling pallets.

More specifically, the invention relates to an independent, removable, load-bearing, handling and transportation pallet, destined to be loaded onto a specific road or rail car-carrying vehicle, for example a truck, a van, a trailer, a semitrailer, an articulated convoy or a wagon, or even a transportation container, itself placed for example on a semitrailer, a container carrier or a wagon.

Description of Related Art

Conventional car-carrying vehicles are generally equipped with a set of plates, known as individual plates because they are each designed to support a car. These platforms are movable and tiltable within the loading space, to optimize the filling of the car-carrier vehicles and thus increase the overall transportation capacity, by making the best use of the shapes and sizes of adjacent cars.

This is for example the case of the semitrailer disclosed in the patent application AU 2008 229 867 which conventionally includes a movable top plate and a bottom plate. To optimize the filling, the bottom plate comprises a motorized platform, which may move between a loading/unloading position and a tilted transportation position.

However, this movable platform, like all the other platforms of the semitrailer described, is inseparable from the semitrailer and cannot be removed from the semitrailer to be placed on the ground. The semitrailer is thus loaded in a conventional manner using the movement capabilities of each of the cars to be transported, which are introduced one by one through the rear of the semitrailer and roll on ramps and tracks up to their final transportation location.

To shorten and facilitate the loading/unloading of cars onto the car-carrier vehicles and to prevent operators from having to mount and move within the vehicle loading space, different vehicles have been developed, for which the loading space remains completely free and is only delimited by two side walls, and which are designed to carry "palletized cars".

In these vehicles, the cars are loaded using independent, removable, handling and transportation pallets, which are placed on the ground outside of the vehicle and a car is placed on each of them. Once strapped in, the pallet/car assembly is then loaded onto the car-carrier vehicle by a robot or a motorized manipulator, preferably automated. The pallet is then attached to the side walls of the car-carrying vehicle in the position and with the tilt that are the most suitable for optimizing the filling of the car-carrying vehicle. Once attached to the walls of the car-carrying vehicle, each of these removable pallets plays the role of an individual platform.

These handling pallets are thus independent and removable structures, which are distinct and separated from the transportation vehicle and the handling apparatus. They do not constitute a vehicle equipment, but rather an accessory of the load (the car) they carry.

In general, the handling pallets are means destined to carry a load. Their structure is designed to allow for the handling and transportation of the pallet with its load, which frees the user from directly handling the goods.

They are thus particularly advantageous for the transportation of cars, which are very delicate to grip for direct handling. In fact, they are indivisible, particularly fragile, high-value goods the integrity and aesthetics of which must absolutely be preserved during handling and transportation.

With such a system, it is not directly the car but rather the assembly formed by the pallet and its load, i.e. the "palletized car", that is handled, carried and moved up to the interior of the transportation vehicle.

The invention relates to independent, removable, handling pallets of this type.

Such pallets have for example been disclosed in the earlier patent U.S. Pat. No. 5,525,026.

The pallets described in this document typically include four flat and substantially rectangular wheel supports, arranged at the four corners of the pallet. When a car is loaded onto this pallet, each of its wheels is supposed to rest on one of these wheel supports.

The problem is that cars have different outlines depending on the model. They have thus a wheelbase (the distance between the front axle and the rear axle of the vehicle), a track (the distance between the two wheels on the same axle) and a wheel diameter that varies depending on the model. Small cars typically have a short wheelbase and a short track, with wheels of small diameters of about 530 mm for example, while in contrast large vehicles have a long wheelbase and a long track, with wheels of much larger diameters up to 800 mm for a limousine or an SUV, and all intermediate configurations are also possible.

However, the pallets described in the prior art have reception structures for the wheels, that are fixed and neither adjustable nor adaptable. These pallets therefore cannot automatically adapt to the different outlines of the cars they are supposed to carry.

Specific pallets of appropriate dimensions must be used depending on the type of cars that are desired to be transported. Different pallet models must therefore be provided as needed, which generates significant additional costs relating to the purchasing of different sets of palettes, and complicates the storage and management of pallet inventories.

BRIEF SUMMARY OF ASPECTS OF THE INVENTION

The object of the invention is to provide a universal, removable pallet allowing a car to be loaded regardless of its outline, in other words its wheelbase, its track and the diameter of its wheels.

The pallet according to the invention adapts to different types of vehicles to be transported without any adjustment, replacement or removal, but only by the nature and the particularly advantageous shape of the means thereof.

Furthermore, the pallets disclosed in U.S. Pat. No. 5,525,026 contain control and actuation means of the fastening system allowing them to be attached to the side walls of the transportation vehicle, which extend to the central portion of the pallet and block it. This central space may not therefore be used for nesting the cars during their transportation.

To optimize the filling of the car-carrying vehicles by nesting as many adjacent cars as possible and leaving no wasted space, the pallets according to the invention are instead made in the form of a frame with a central free space allowing the nesting to be optimized, and with two reception areas, one at the front and another at the rear, to support the wheels of the car to be transported.

This nesting may further be improved if the pallet is designed to tilt at one or both of the ends thereof, according to a preferred embodiment of the invention, and for this purpose it includes articulated, end support areas. When a car is loaded onto this load-bearing pallet, it is thus possible to lower one of the set of wheels thereof, or both of the set of wheels thereof simultaneously, in order to obtain the optimum loading configuration leading to the best possible nesting of all of the cars transported in the car-carrying vehicle or container.

Lastly, to reduce the transported weight, to limit the cost thereof and not to impact the possibility to perforate the pallet, the pallet according to the invention contains no driving means, contrary to that disclosed in U.S. Pat. No. 5,525,026 which includes driving and transmission means within the thickness thereof in order to implement the system described.

The pallet according to the invention advantageously meets all these requirements and confers many operational advantages compared to systems known in the prior art.

To solve this technical problem, the invention teaches of an individual, removable, handling and transportation, load-bearing pallet destined to carry a car and to be loaded onto a car-carrying vehicle or container.

This load-bearing pallet comprises two longitudinal beams mechanically interconnected by crosspieces, a first end support area located at the first end of the load-bearing pallet which supports the wheels of the first set of wheels of the car in the transportation position, a second end support area located at the second end of the load-bearing pallet which supports the wheels of the second set of wheels of the car in the transportation position, and a central space located between the longitudinal beams, the first end support area and the second end support area.

According to the invention, the load-bearing pallet is unmotorized and the central space thereof is free.

Furthermore, the first end support area comprises:
a wheel rest, located at the first end of the load-bearing pallet and against which the wheels of the first set of wheels of the car abut in the transportation position,
a transverse element, which connects both longitudinal beams and includes two oblique arms joined by a central portion directed toward the first end of the load-bearing pallet, and
a recess, defined between the wheel rest, the transverse element and the longitudinal beams, which has a width continually and symmetrically decreasing from the longitudinal beams to the central portion, and wherein both wheels of the first set of wheels of the car sink down and are wedged in the transportation position, regardless of the wheelbase, the track and the diameter of the wheels of the car to be transported.

The second end support area comprises a decking the dimensions of which are sufficient to support the wheels of the second set of wheels of the car when the wheels of the first set of wheels of the car are sunk down and wedged into the recess in the transportation position, regardless of the wheelbase, the track and the diameter of the wheels of the car to be transported.

In one embodiment of the pallet according to the invention, at least one of the end support areas is an articulated portion and may be placed in a tilted position relative to the axis of the central portion of the longitudinal beams.

In one embodiment of the invention, the wheel rest, which is preferably carried by the end crosspiece of the load-bearing pallet, comprises a tilted plane, rising in the direction of the first end of the load-bearing palette. The wheel rest may be formed of two discrete support elements, each serving as an individual bearing means for one of the wheels of the first set of wheels of the car.

In one embodiment of the invention, the transverse element has a flattened tubular section with a flat bottom and tilted edges. The central portion thereof is preferably pointed, rounded or flat, conferring to the transverse element a general chevron, arc, or partially trapezoidal shape.

In one embodiment of the invention, the decking has a recess in the central portion thereof. It preferably begins and ends with a tilted end portion which gradually rises from the edge of the decking. The decking may be formed of two individual support plates, each destined to support one of the wheels of the second set of wheels of the car.

In one embodiment of the invention, the decking, the transverse element or the wheel rest is made of perforated sheet metal or non-slip material.

In one embodiment of the invention, the load-bearing pallet comprises an integrated strapping system, preferably a ratchet tensioning system, allowing the wheels of the car to be secured. At least one of the crosspieces may be tubular and partially open to house this strapping system.

In one preferred embodiment of the invention, the longitudinal beams of the load-bearing pallet include openings giving access to a hollow housing formed in each of these longitudinal beams, this hollow housing being intended to receive driving or actuating means of a gripper, which are engaged through the openings and are used to move or orient the unmotorized load-bearing pallet and/or to actuate means to lock the pallet in the transportation position thereof.

BRIEF DESCRIPTION OF THE DRAWINGS

Other features and advantages of the invention will become apparent upon reading the following non-limiting detailed description, made with reference to the accompanying drawings, wherein.

DETAILED DESCRIPTION OF ASPECTS OF THE INVENTION

The universal, load-bearing pallet according to this invention will now be described in detail with reference to the figures. Equivalent items shown in different figures will bear the same reference numbers or alphanumeric characters.

Figure 1:
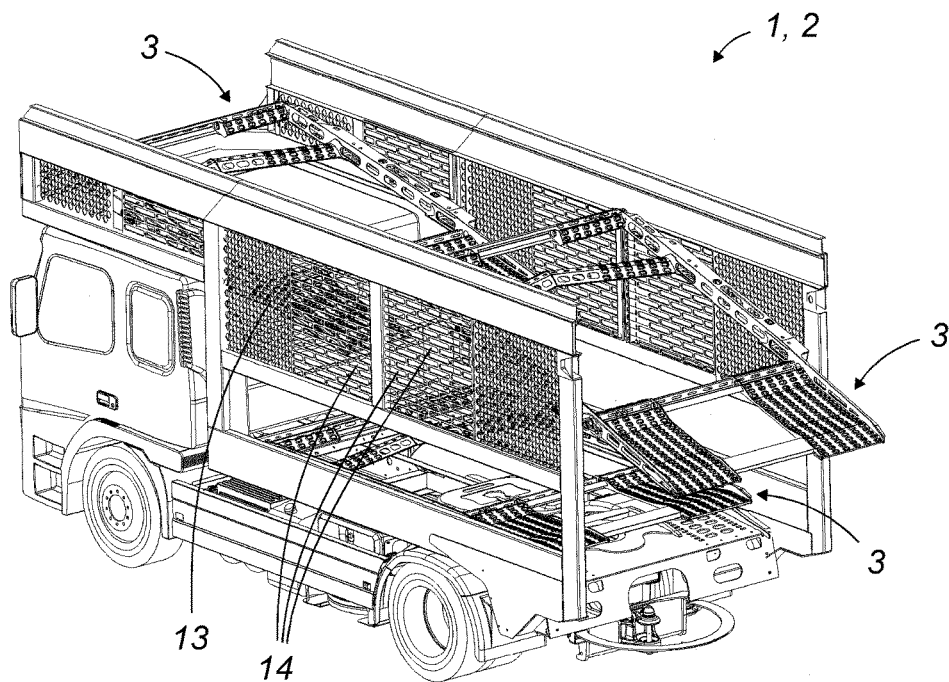
FIG. 1 is a general perspective view of a car-carrying truck equipped with individual load-bearing pallets secured to the car-carrying truck, according to a first embodiment of the invention.

FIG. 1 depicts a first implementation example of universal pallets according to the invention.

This is a car-carrying vehicle 1 such as a truck 2 that includes a set of load-bearing pallets 3, each designed to support a car, which had previously been mounted on the car-carrying vehicle and secured to the side structure thereof.

As will be described in more detail hereinbelow, according to the invention these load-bearing pallets 3 have means allowing them to adapt without any adjustment to all conventional car outlines to be transported.

Figure 2:
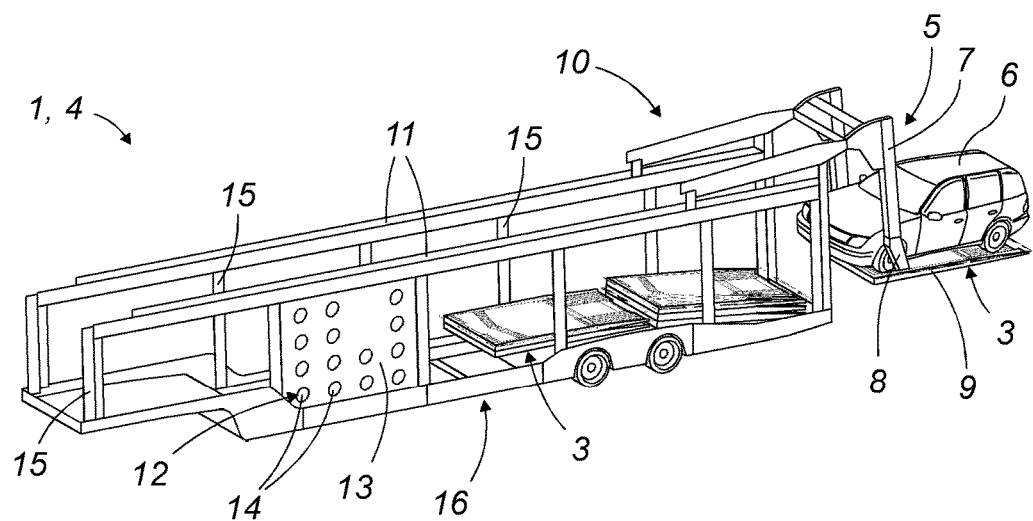
FIG. 2 is a general perspective view of a car-carrying vehicle such as a semitrailer equipped with a handling robot that charges removable pallets, according to a second embodiment of the invention.

FIG. 2 shows a second implementation example of the universal, load-bearing pallets 3 according to the invention.

This time, this is a car-carrying vehicle 1 such as a semitrailer 4 equipped to receive removable, load-bearing pallets 3 that are loaded using a motorized and preferably automated manipulator 5.

FIG. 2 depicts a loading phase during which a load-bearing pallet 3 according to the invention, which supports a car 6, is loaded onto the semitrailer 4.

The load-bearing pallet 3 is moved by means of the motorized manipulator 5 which grasps the load-bearing pallet 3 by means of two side arms 7, each ending with a gripper 8. The load-bearing palette 3 is therefore gripped or attached via the gripper 8 on each of the sides thereof and more specifically on each of the longitudinal longitudinal beams 9 thereof.

Within the longitudinal beams 9 thereof, the load-bearing pallet 3 preferably includes openings 41 within which the grippers 8 of the manipulator 5 can engage to grip the load-bearing pallet 3.

Advantageously, these openings 41 can provide access to a hollow housing 42 formed in the corresponding side member 9 of the load-bearing pallet 3. This housing 42 can thus receive drive, activation or actuation means belonging to the gripper 8 and used to move and/or orient the unmotorized load-bearing pallet 3, and/or to actuate a locking assembly 12 of the load-bearing pallet 3 in the transportation position on the vehicle 1.

These openings 41 and these housings 42 thus form receiving means destined to engage with the grippers 8.

A cart 10 carrying the manipulator 5 moves on guide rails 11 extending along and on either side of the loading space within the semitrailer 4. The cart 10 allows the manipulator 5 and consequently the load-bearing palette 3 to move within the loading space.

The side arms 7 are advantageously telescopic and hinged on the cart 10 and the grippers 8 are in turn hinged on the lower ends of said side arms 7.

The manipulator 5 allows, on the one hand, the load-bearing palette 3 to move in a vertical direction and in a horizontal direction, and on the other hand the orientation of the load-bearing palette 3 to be changed by means of the grippers 8.

Once the load-bearing pallet 3 is placed at the right place and in an optimal position for transportation, it is attached to the vehicle 1, for example the truck 2 or the semitrailer 4, using a locking assembly 12 with some of the means thereof being carried by the load-bearing pallet 3 and the others by the vehicle 1.

For this purpose, the vehicle 1 may have on the lateral sides thereof, side walls forming a support structure 13, which is provided with housings 14 that are part of this locking assembly 12. Although it is partially shown in FIG. 2 for reasons of simplicity, the support structure 13 advantageously extends between all of the upright members 15 connecting the base 16 of the semitrailer 2 to longitudinal rails 11.

The load-bearing pallet 3 also includes additional means belonging to this locking assembly 12 allowing the load-bearing pallet 3 to be immobilized on the support structure 13.

Figure 3:
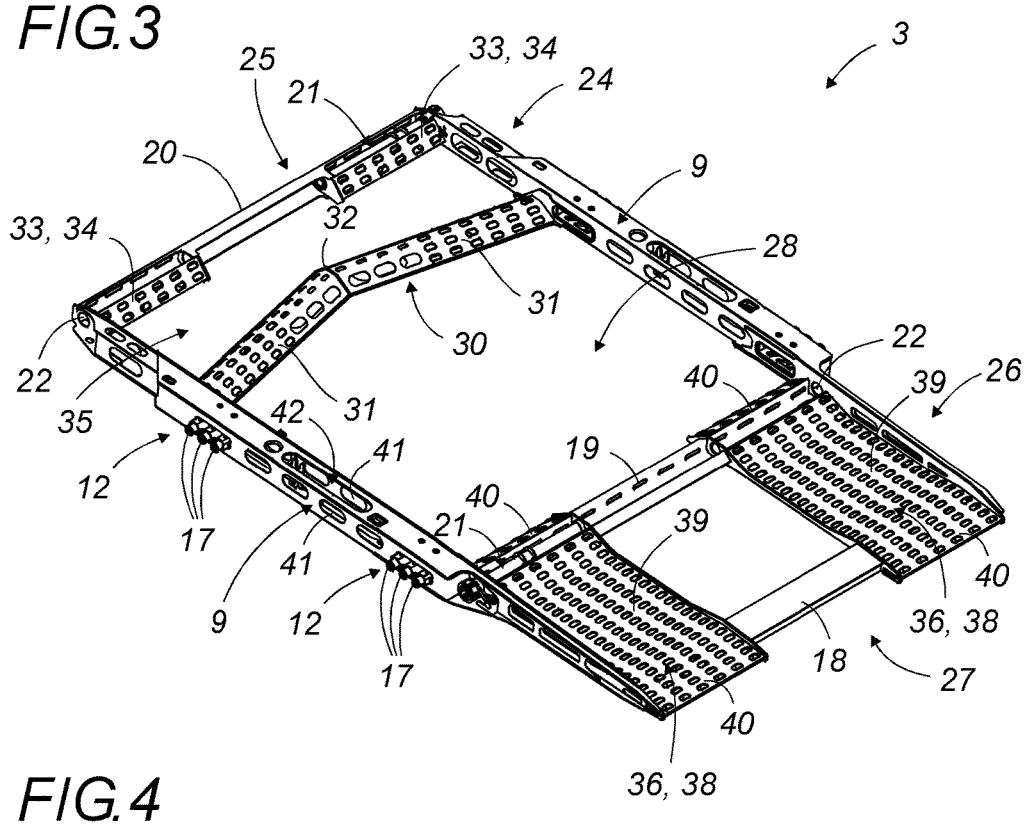
FIGS. 3 and 4 are a perspective view and a top view, respectively, of an example of universal, load-bearing pallet according to the invention.

The load-bearing pallet 3 shown in FIG. 3 includes for example retractable studs 17 that engage with the housings 14 of the car-carrying vehicle or container to lock the removable pallet onto the car-carrying vehicle or container.

Figure 4:
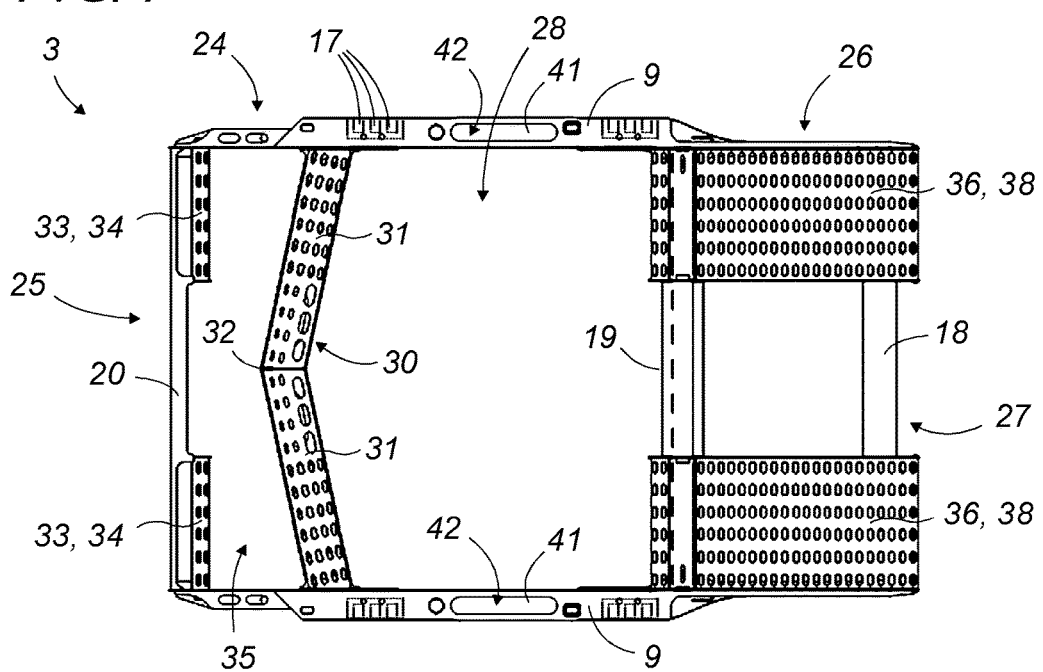

The studs 17 are mounted sliding within the longitudinal beams 9 of the load-bearing pallet 3 and are able to engage in housings 14 provided within the support structure 13. These studs 17 are for example arranged in two groups of three studs 17 in each longitudinal beam 9, so as to form four locking elements of the pallet. Advantageously, these studs 17 are intended to be moved between a retracted position within the longitudinal beam 9 (shown in FIG. 4) corresponding to the unlocking of the load-bearing pallet 3 and a laterally protruding position relative to the longitudinal beams 9 (shown in FIG. 3) corresponding to the locking of said load-bearing pallet 3.

Each longitudinal beam 9 may further include drive members (not shown) allowing the studs 17 to be moved from one position to another.

Once the load-bearing pallet 3 is immobilized on the support structure 13 by means of the locking assembly 12, it is released by the grippers 8 and detached from the manipulator 5. The cart 10 can then move to the stock of load-bearing pallets 3 placed at the rear of the semitrailer 4. The manipulator 5 grasps the next load-bearing pallet 3, places said pallet on the ground outside the vehicle such that it is possible to mount thereon and secure thereto a new car 6, then raises said pallet once loaded.

The above operations are then repeated until the entire load to be transported is loaded and attached in the semitrailer 4 in the transportation position.

FIGS. 3 to 8 show in isolation an embodiment of the load-bearing pallet 3 according to the invention.

The load-bearing pallet 3 shown comprises a general frame structure that includes two longitudinal beams 9 mechanically interconnected by crosspieces 18, 19, 20 preferably tubular for extra stiffness and with a round or rectangular section, for example.

In a preferred embodiment of the invention, some of these crosspieces, 19 and 20 of the example shown, may partially be open for example on the top, to house a strapping system 21 required for securing the cars to the load-bearing pallet 3. A number of openings 22 are also provided in the longitudinal beams 9 to enable the passing of the strapping system.

Advantageously, the strapping system 21 can already be integrated into the load-bearing pallet 3 for greater operator comfort. This is for example, as shown, a ratchet tensioning system allowing the wheels 23 of the car 6 to be attached securely and in compliance with applicable standards.

The load-bearing pallet 3 also includes a first end support area 24 located at the first end 25 of the load-bearing pallet 3, and a second end support area 26 located at the second end 27 of the load-bearing pallet 3. These end support areas 24, 26 extend transversely to the longitudinal beams 9 and are attached to the crosspieces 18, 19, 20.

The two longitudinal beams 9 and the two end support areas 24, 26 define between them a central space 28 that remains free and may be crossed to facilitate the nesting of the cars carried by the various palettes 3 in order to transport as many cars as possible. This free central space 28 thus allows a projecting portion of a nearby car to pass through: for example the roof thereof, the end of the trunk thereof or the hood thereof.

The first end support area 24 is intended to receive the first set of wheels 29, either front or rear, of the car 6 in the transportation position.

This first end support area 24 comprises a transverse element 30 which connects the two longitudinal beams 9 of the load-bearing pallet 3. This transverse element 30 includes two oblique arms 31, joined by a central portion 32 directed toward the first end 25 of the load-bearing pallet 3 and preferably pointed, rounded or flat, conferring to the assembly a general chevron, arc or partially trapezoidal shape.

This transverse element 30 is preferably made of perforated sheet metal, or other non-slip material.

It preferably has a flattened tubular section, preferably with a flat bottom and tilted edges, for example in the form of a half-ellipse. The tubular shape of the section thereof gives it sufficient stiffness to connect with the longitudinal beams 9 and support the weight of the car 6 without having to be mechanically reinforced by means of an additional crosspiece at that level. Of course, adding one more crosspieces at this level may be envisaged without going beyond the scope of the invention.

In addition, due to the tilted edges thereof, the transverse element 30 advantageously forms two gradual ramps, successively ascending and descending, which allow for a smooth crossing of this transverse element 30 by the wheels 23 of a car 6.

This first end support area 24 also includes a wheel rest 33, preferably carried by the end crosspiece 20 of the load-bearing pallet 3, which is a bearing means for the ends of the wheels 23 of the first set of wheels 29 of the car 6. This wheel rest 33 may be continuous over substantially the entire length of the crosspiece 20 or, as in the preferred example shown, it may be formed of two discrete support elements 34, each serving as an individual bearing means for one of the wheels 23 of the first set of wheels 29 of the car 6, for example located at the two ends of the crosspiece 20.

This wheel rest 33 may be directly formed in the end crosspiece 20 or preferably implemented in the form of an extension thereof as shown, or even an independent means secured thereto.

This wheel rest 33, against which the front or rear wheels 23 of the car 6 abut, is preferably in the form of a tilted plane, rising toward the end of the load-bearing pallet 3, and preferably made of perforated sheet metal or other non-slip material.

The transverse element 30 and the wheel rest 33 define between them a recess 35, which preferably has an open bottom, is bordered laterally by the longitudinal beams 9 and has a width that varies because of the shape of the transverse element 30.

In the transportation position of the car 6, this recess 35 receives the two wheels 23 of the first set of wheels 29 which sink down and are satisfactorily wedged therein, without adjustment and irrespective of their diameter, owing to the variable width of this recess 35.

The second end support area 26 includes a decking 36 intended to support the second set of wheels 37, either front or rear, of the car 6 in the transportation position.

This decking 36 is preferably formed of two individual support plates 38, each intended to support one of the wheels 23 of the second set of wheels 37 of the car 6, and for example made of perforated sheet metal or non-slip material.

These individual support plates 38 have sufficient length to be able to support the wheels 23 of the car regardless of the model and the outline thereof and to be able to adapt to differences in wheelbase as will be explained below.

Similarly, the width of these individual support plates 38 is sufficient for them to be able to adapt to all the widths of the wheels 23 that are likely to be encountered and to differences in tracks from one car model to another.

As can be seen in FIG. 3, the individual support plates 38 are preferably not flat, but advantageously have a recess 39 in their central portion. This recess 39 is intended to receive the wheels 23 of the car 6 to be transported, which advantageously allows the overall height of the load to be lowered, thus improving the nesting of all cars to be transported in order to optimize their loading.

The individual support plates 38 preferably begin and end with a tilted end portion 40 which gradually rises from the edge of the plate 38. This tilted portion 40 advantageously serves as a gradual ramp for the wheels 23 of the car 6 which has to mount and roll on the load-bearing pallet 3, placed on the ground, to reach its loading position.

In a further embodiment not shown, the second end support area 26 may also be implemented as a single continuous transverse decking 36, although this solution is less advantageous in that it requires more material.

Advantageously, the load-bearing pallet 3 according to the invention allows for the loading of the car 6 regardless of the outline thereof, in other words regardless of the wheelbase thereof, the track thereof and the diameter of the wheels thereof. This adaptation to the different outlines of the vehicles likely to be transported is automated, without any adjustment and without changing, mounting or moving the components.

Of course, this adaptation is only possible with vehicles of conventional outlines, in other words those with a wheelbase and a track that are equal to or range between the minimum and maximum wheelbase and track values encountered with the various models of vehicles manufactured by automakers.

This effect is obvious from the aforementioned, but will be better understood from FIGS. 5 to 8.

Figure 5:
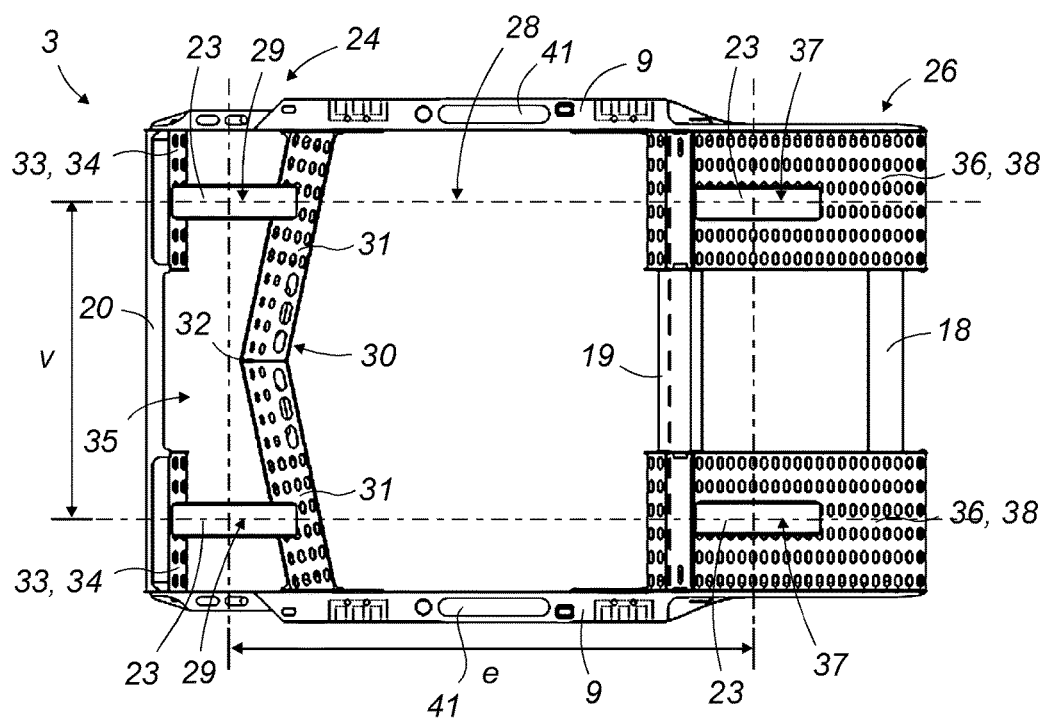
FIGS. 5 and 6 are a top view and a longitudinal cross view, respectively, of the universal, load-bearing pallet of FIG. 3, which shows the wheels of a small car.
Figure 6:
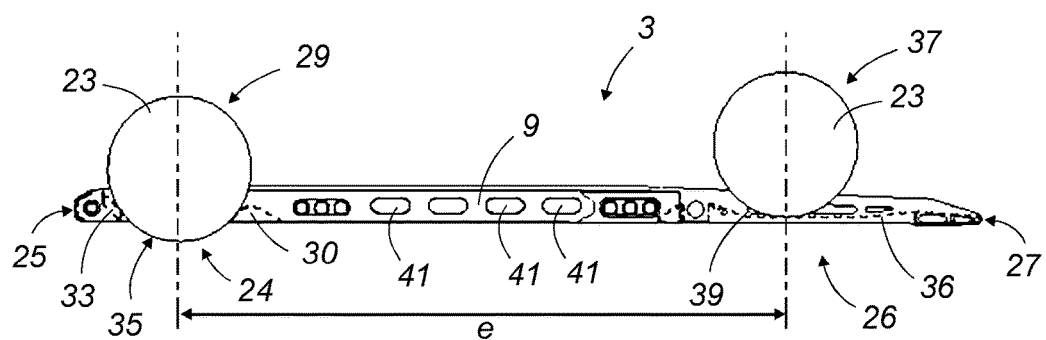

FIGS. 5 and 6 relate to the case of a small car, its wheels 23, of small diameter, being shown on the pallet 3. This small car typically has a short wheelbase (identified in the figures by the letter e) and a short track (identified in the figures by the letter v).

As the track thereof is short, this car can be loaded into the central portion of the load-bearing pallet 3. In this area, the recess 35 has a reduced width, as it approaches the central portion 32 of the transverse element 30. Despite their small diameter, each of the wheels 23 of the first set of wheels 29 of the small car is perfectly wedged into this recess 35, on one side by the support element 34 and on the other by the oblique arm 31 of the transverse element 30.

This effect is preferably further reinforced by the facing walls being tilted toward each other of the support element 34 and of the oblique arm 31, which allows a perfect adaptation to the diameter of the wheel and a suitable sinking down thereof.

The other two wheels 23 of the small car rest on the front portion of the support plates 38.

Figure 7:
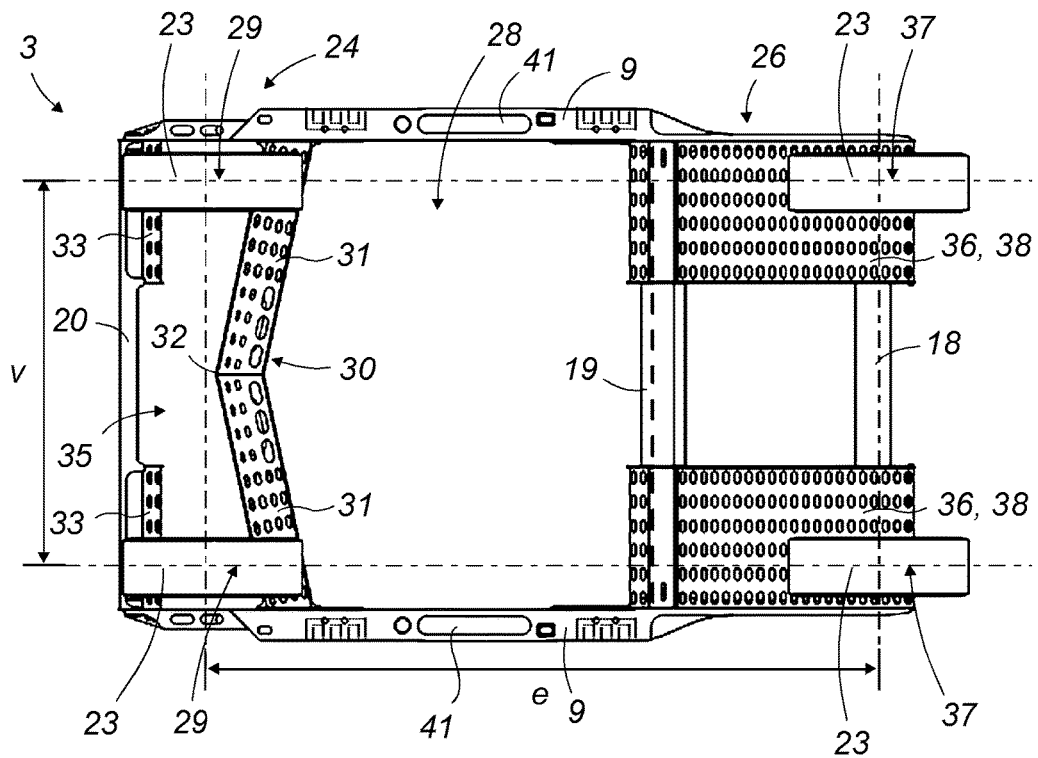
FIGS. 7 and 8 are a top view and a longitudinal cross view, respectively, of the universal load-bearing pallet of FIG. 3, which shows the wheels of a large car.
Figure 8:
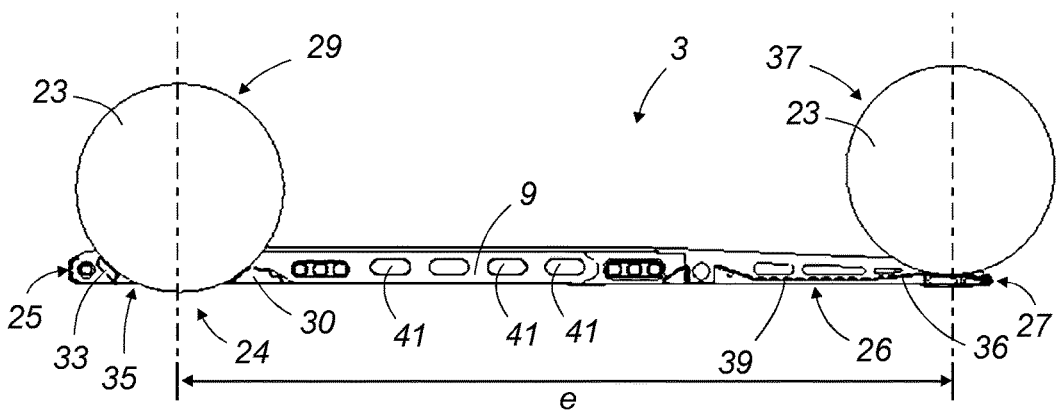
Figure 9A:
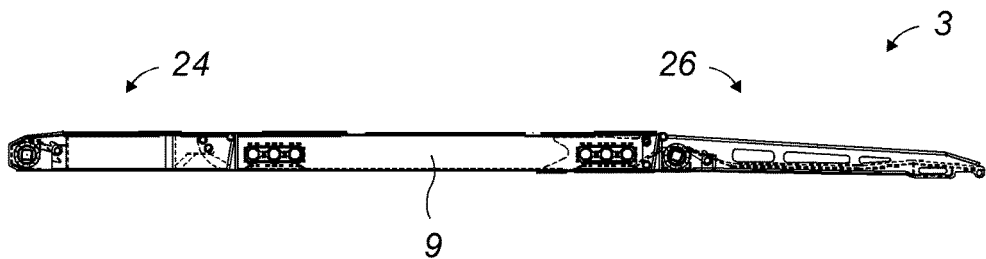
FIGS. 9a, 9b; 9c, 9d are profile views of potential configurations by means of the adjustment of an embodiment of a load-bearing pallet according to the invention.
Figure 9B:
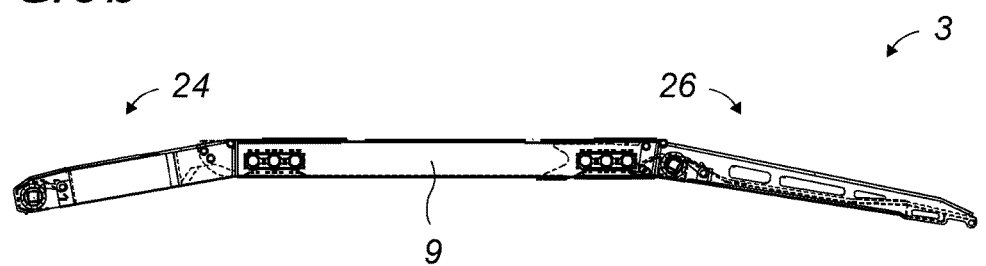
Figure 9C:
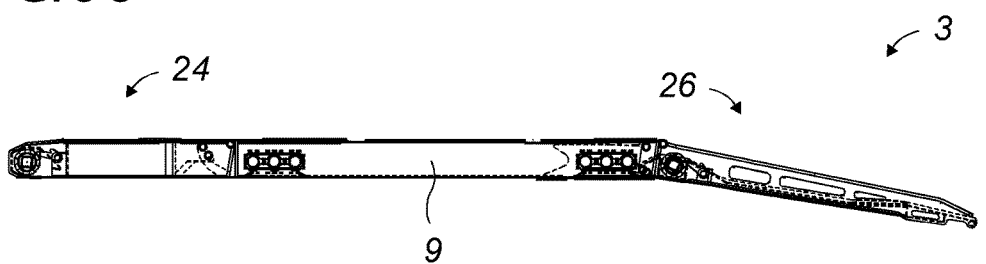
Figure 9D:
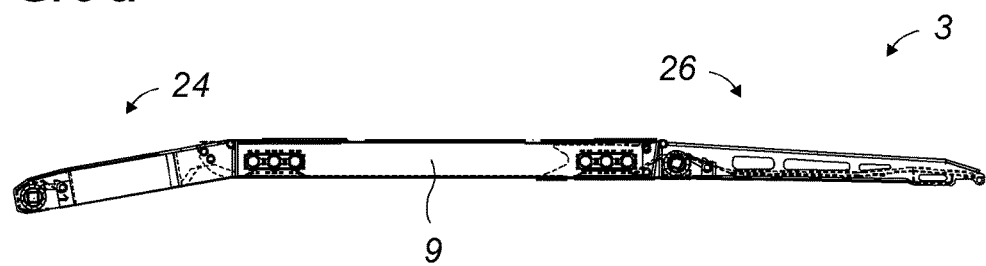

When, on the contrary, it is desired to load a large car on the load-bearing pallet 3, this is a situation shown in FIGS. 7 and 8.

Large cars, the wheels 23 of which have large diameters, consistently have a long wheelbase (identified in the figures by the letter e) accompanied by a long track (identified in the figures by the letter v).

In this case, as the track is long, the car is loaded in the lateral area of the load-bearing pallet 3, near the longitudinal beams 9. In this area, the recess 35 has a much larger width, as it is located near the end of the oblique arms 31 of the transverse element 30.

Despite their large diameter, the wheels 23 of the large car can properly sink down into the recess 35 and be satisfactorily wedged and maintained therein. Again, the tilt of the facing walls of the support element 34 and of the oblique arm 31 allows for perfect adaption to the diameter of the wheels in order to ensure their appropriate sinking down and wedging.

In this case, the other two wheels 23 of the large car rest on the rear portion of the support plates 38 which are provided with sufficient length.

All other cases of intermediate outlines are similarly possible. In fact, the width of the recess 35 varies continuously between these two extremes.

In a preferred embodiment of the invention, the load-bearing pallet 3 may be articulated in the vicinity of one of the ends 25 or 27 thereof or at both ends 25 and 27 carrying the end support areas 24 and 26, respectively.

For this purpose, it has for example hinges at the longitudinal beams 9 thereof that allow the end support area(s) 24, 26 to tilt relative to the central portion of the longitudinal beams 9. The first end support area 24 located at the first end 25 of the load-bearing pallet 3 and/or the second end support area 26 located at the second end 27 of the load-bearing pallet 3 may thus be placed in a downward reclining position relative to the axis of the central portion of the longitudinal beams 9. Examples of possible configurations of the load-bearing pallet 3 are shown in FIGS. 9a, 9b, 9c and 9d. The desired inclination of the ends 25, 27 of the load-bearing pallet 3 is advantageously obtained by manual adjustment.

The hinges advantageously allow the stiffness of the assembly of the load-bearing pallet 3 to be maintained after adjusting the desired inclination of the end support area 24 or 26.

When a car 6 is loaded onto this load-bearing pallet 3, it is thus possible to lower one of the set of wheels 29 or 37 thereof or both of its sets of wheels 29 and 37 simultaneously, to obtain the optimum loading configuration leading to the best possible nesting of all of the cars 6 transported in the car-carrying vehicle 1 or container.

Of course, within a load, not all of the load-bearing pallets 3 are necessarily articulated. Accordingly, depending on the number and nature of the cars to be transported, some pallets 3 located at specific places within the loading space may be articulated, while others are not.

Obviously, the invention is not limited to the preferred embodiments described above and shown in the various figures, a person skilled in the art being able to make numerous modifications and imagine other embodiments without going beyond the framework and scope of the invention as defined by the claims.

The invention claimed is:

1. A load-bearing pallet adapted to support a car to be loaded onto a car-carrying vehicle or a container, the load-bearing pallet comprising: two longitudinal beams mechanically interconnected by crosspieces; a first end support area located at a first end of the load-bearing pallet; a second end support area located at a second end of the load-bearing pallet; and a free central space defined by the two longitudinal beams, the first end support area, and the second end support area; wherein the load-bearing pallet is an individual, removable, unmotorized, handling and transportation load-bearing pallet;

Wherein the first end support area comprises:
a wheel rest located at the first end of the load-bearing pallet against which wheels of a first set of wheels of the car abut;
a transverse element between the two longitudinal beams, the transverse element having two oblique arms joined at a central portion, the two oblique arms directed toward the first end of the load-bearing pallet; and
a recess defined by the wheel rest, the transverse element, and the two longitudinal beams, the recess having a width continuously and symmetrically decreasing from each of the two longitudinal beams to the central portion, and wherein the recess receives the wheels of the first set of wheels regardless of a wheelbase, a track, and a diameter of the wheels of the car; and
wherein the second end support area comprises a decking sufficient to support wheels of a second set of wheels of the car when the wheels of the first set of wheels are positioned in the recess of the first end support area, regardless of the wheelbase, the track, and the diameter of the wheels of the car.

2. The load-bearing pallet according to claim 1, wherein at least one of the first and the second end support areas is articulated; and wherein at least one of the first and the second end support areas is tiltable relative to an axis of a central portion of the two longitudinal beams.

3. The load-bearing pallet according to claim 1, wherein the wheel rest is formed of two support elements, each of the two support elements serving as an individual support for one of the wheels of the first set of wheels of the car.

4. The load-bearing pallet according to claim 1, wherein the wheel rest is mounted on an end crosspiece of the load-bearing pallet.

5. The load-bearing pallet according to claim 1, wherein the wheel rest comprises a tilted plane rising in a direction toward the first end of the load-bearing palette.

6. The load-bearing pallet according to claim 1, wherein the central portion of the transverse element is pointed, rounded, or flat.

7. The load-bearing pallet according to claim 1, wherein the transverse element is tubular having a flat bottom and tilted edges.

8. The load-bearing pallet according to claim 1, wherein the decking comprises two individual support plates, each of the two individual support plates adapted to support one of the wheels of the second set of wheels of the car.

9. The load-bearing pallet according to claim 1, wherein the decking includes a recess.

10. The load-bearing pallet according to claim 1, wherein the decking includes tilted end portions.

11. The load-bearing pallet according to claim 1, wherein the decking, the transverse element, or the wheel rest comprise perforated sheet metal or non-slip material.

12. The load-bearing pallet according to claim 1, wherein the pallet further comprises an integrated strapping system adapted to secure the wheels of the car to the pallet.

13. The load-bearing pallet according to claim 12, wherein at least one of the crosspieces is tubular and adapted to receive the integrated strapping system.

14. The load-bearing pallet according to claim 1, wherein the longitudinal beams each comprise a hollow housing having openings, the hollow housing adapted to receive driving or actuating means of a gripper.

15. The load-bearing pallet according claim 6, wherein the transverse element comprises one of a general chevron shape, an arc shape, and a partially trapezoidal shape.

16. The load-bearing pallet according claim 14, wherein the gripper engages the hollow housing through the openings, and the gripper moves or orients the load-bearing pallet or actuates means to lock the pallet in a position.

* * * * *